April 9, 1929.  H. D. GEYER  1,708,221
SPRING COUPLING
Filed Jan. 21, 1927  2 Sheets-Sheet 1
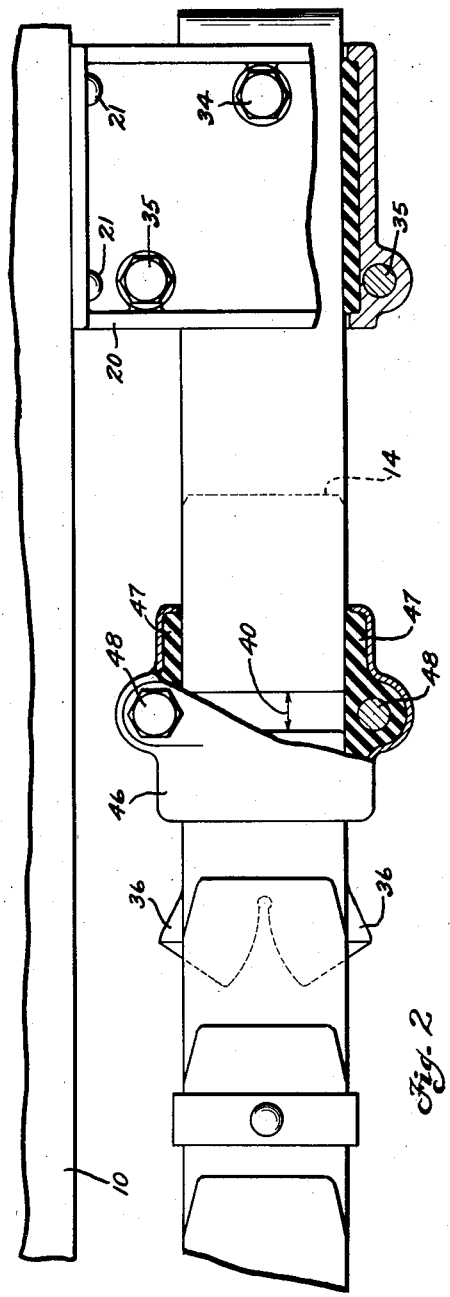
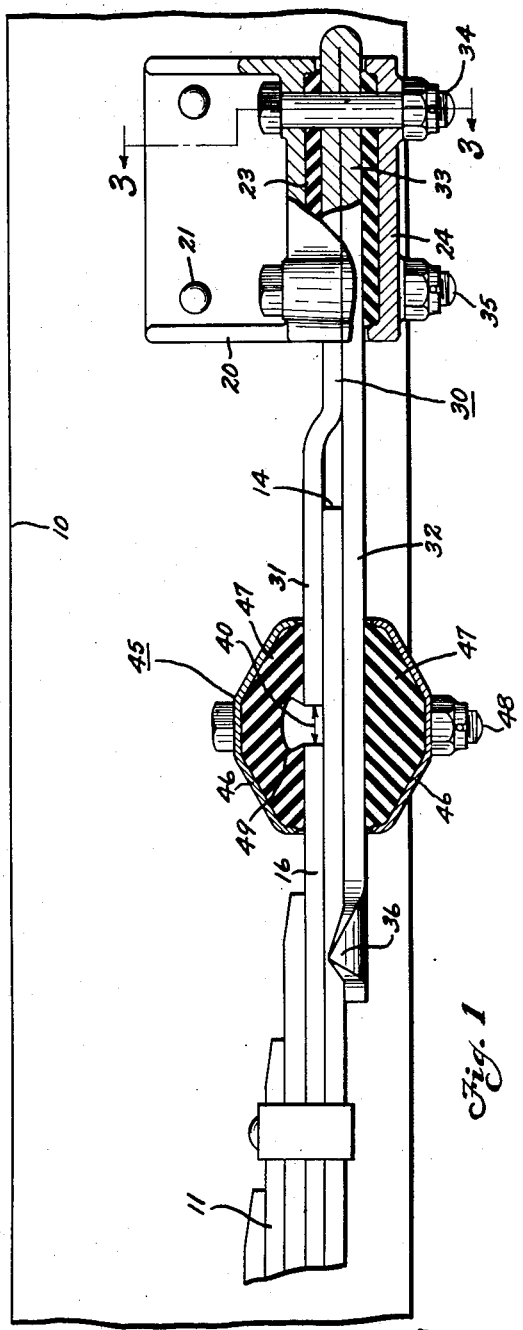
Inventor
Harvey D. Geyer
By Spencer Hardman & Fehr
his Attorneys.

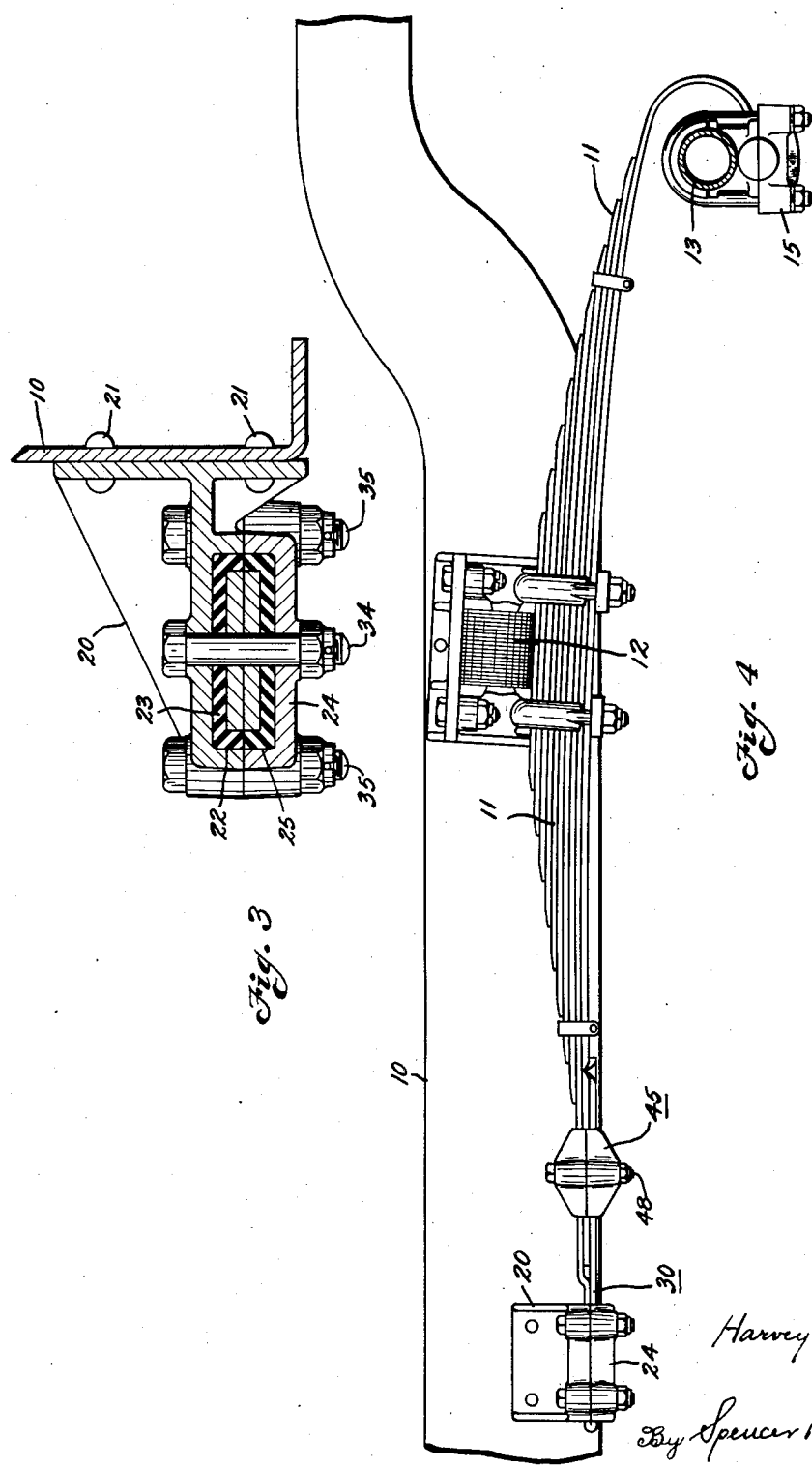

Patented Apr. 9, 1929.

1,708,221

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

SPRING COUPLING.

Application filed January 21, 1927. Serial No. 162,604.

This invention relates to an extension coupling for connecting one end of a cantilever spring to the chassis frame of a motor vehicle, and for use in similar arrangements.

An object of this invention is to provide an extension coupling which will permit a very easy longitudinal movement of the spring end and in effect increase the length of the spring, whereby easier riding is obtained.

Another object is to provide an extension coupling which isolates the spring end from the chassis frame with elastic rubber or other non-metallic material. The coupling of this invention is intended to be used with other non-metallic couplings which completely isolate the spring from the chassis frame by non-metallic material. By such means, noises and vibrations in the running gear of the automobile are prevented from being transmitted through the springs to the body, further advantages lie in the absence of wear, rattle, and necessity of lubrication present with ordinary spring shackles.

Further objects and advantages of the present invention will be apparent from the following description, reference being had to the accompanying drawings wherein a preferred embodiment of one form of the present invention is clearly shown.

In the drawings:

Fig. 1 is a side elevation, with certain parts in vertical section, of the front end of an automobile cantilever spring connected to the chassis frame by means of a coupling built according to this invention;

Fig. 2 is a plan view of the parts shown in Fig. 1, with certain parts in horizontal section;

Fig. 3 is a vertical section on line 3—3 of Fig. 1; and

Fig. 4 illustrates the complete cantilever spring connected at its rear end to the stationary rear axle and at its intermediate portion to the chassis frame by other forms of non-metallic connections not claimed in this application.

Similar reference characters refer to similar parts throughout the drawings.

10 designates the side rail of the chassis frame. The spring 11 is pivotally attached at its central portion to side rail 10 by means of a non-metallic coupling 12. At its rear end the spring 11 is attached to the stationary rear axle 13 by means of a non-metallic coupling 15. The coupling 12 is completely disclosed and claimed in a co-pending application, Serial No. 154,810, filed Dec. 14, 1926. The coupling 15 is completely disclosed and claimed in a co-pending application, Serial No. 155,801, filed Dec. 20, 1926.

At the forward end of the spring 11, the side rail 10 has a bracket 20 rigidly fixed thereto, by rivets 21. This bracket 20 has a recess 22 therein forming a half-housing for an elastic rubber block 23. A metal cap 24 is rigidly bolted to the under-side of bracket 20 and has a recess 25 therein corresponding to recess 22, thus completing the other half-housing for the elastic rubber block 23. A guide member 30 for the forward end of the long leaf 14 of spring 11, is formed by doubling back upon itself a strip of spring steel as clearly shown in Fig. 1. The upper leaf 31 and the lower leaf 32 of guide member 30 lie respectively on the upper and lower sides of the spring leaf 14 and support and guide the same, but permit a relative sliding of leaf 14 therebetween. The forward end 33 of guide member 30 is firmly clamped in place between cap 24 and bracket 20, being isolated from both, however, by the elastic rubber block 23, as clearly shown in Figs. 1 and 3. The rubber block 23 may be made in two halves, or if desired, in one piece having an oblong slot therein so that it may be slipped over the end 33 of the guide member before it is set within the housing formed by bracket 20 and cap 24. The forward bolt 34 passes through a hole in the end 33, while the two bolts 35 pass on either side thereof, as best shown in Fig. 2. The elastic rubber block 23 is highly compressed by the cap 24 and so maintains guide member 30 in substantially fixed position, but is sufficiently yieldable to prevent transmission of vibrations from member 30 to the side rail 10.

The upper leaf 31 of member 30 stops short of the end of the second leaf 16 by the clearance distance 40, while the bottom leaf 32 extends considerably beyond the end of leaf 16. Preferably the end of leaf 32 is split and spread apart to provide two side guide lugs 36 which aid in keeping the spring 11 and guide member 30 properly aligned.

45 indicates as a whole the yieldable rubber clip for clamping the leaves 16, 31, 14 and 32 in place and at the same time permitting relative sliding therebetween. This clip 45 comprises two pressed metal half-housings 46 rigidly clamped upon and compressing the elastic rubber block 47 (preferably made in two halves) by the two bolts 48. It will be clear from the drawings how the elastic rubber 47 completely isolates the metal housing 46 from the spring leaves. This rubber clip 45 holds the end of spring 11 properly aligned with the guide member 30, but permits easy telescoping of the leaf 14 with said guide member. There is little or no relative sliding of the rubber 47 upon the metal parts, as the elastic rubber will distort sufficiently to permit the required motion without sliding of the surfaces of the rubber upon the contacting metal surfaces.

The rubber block 47 surrounds and encloses the clearance gap 40 between the ends of the spring leaf 16 and leaf 31 and so prevents dirt, gravel, etc. from lodging in the gap and causing trouble. The block 47 has a slot or recess 49 therein, as clearly shown in Fig. 1, so that the elastic rubber when compressed by the metal housings 46 will not flow down into the clearance gap 40 and interfere with the telescoping action of the spring 11 and guide member 30.

While the form of embodiment of the present invention as herein disclosed, constitutes a preferred form, it is to be understood that other forms might be adopted, all coming within the scope of the claims which follow.

What is claimed is as follows:

1. In combination with a leaf spring and frame member of a vehicle, a shackle comprising: a metal guide member having sliding engagement with the end of the long leaf of said spring, and means for clamping said guide member to said frame, said means having elastic rubber interposed between and isolating said guide member from said frame.

2. In combination with a leaf spring and frame member of a vehicle, a shackle comprising: a metal guide member having two spring members between which the end of the long leaf of said spring is slidably supported, and means for securing said guide member to said frame.

3. In combination with a leaf spring and frame member of a vehicle, a shackle comprising: a metal guide member having two spring members between which the end of the long leaf of said spring is slidably supported, and means for securing said guide member to said frame, said means having elastic rubber interposed between and isolating said guide member from said frame.

4. An extension coupling connecting the end of a spring leaf to a relatively movable part comprising: a metal guide member having two yieldable leaves slidably engaging and supporting the end of said spring leaf therebetween, means for securing said guide member to said relatively movable part, and means for maintaining said spring leaf in its longitudinal aligned position between said yieldable leaves.

5. An extension coupling connecting the end of a spring leaf to a relatively movable part comprising: a metal guide member having two yieldable leaves slidably engaging and supporting the end of said spring leaf therebetween, means for securing said guide member to said relatively movable part, and yieldable means for urging said yieldable leaves together upon said spring leaf.

6. An extension coupling connecting the end of a spring leaf to a relatively movable part comprising: a metal guide member having two yieldable leaves slidably engaging and supporting the end of said spring leaf therebetween, means for securing said guide member to said relatively movable part, and means for maintaining said spring leaf in its longitudinally aligned position between said yieldable leaves, said yieldable means comprising an elastic rubber block surrounding the overlapping yieldable leaves and spring leaf and a metal housing surrounding said rubber block and holding it under compression.

In testimony whereof I hereto affix my signature.

HARVEY D. GEYER.